United States Patent [19]
Shimizu et al.

[11] Patent Number: 5,662,401
[45] Date of Patent: Sep. 2, 1997

[54] INTEGRATING LENS ARRAY AND IMAGE FORMING METHOD FOR IMPROVED OPTICAL EFFICIENCY

[75] Inventors: Jeffrey A. Shimizu; Peter Johannes Michiel Janssen, both of Westchester County, N.Y.

[73] Assignee: Philips Electronics North America Corporation, New York, N.Y.

[21] Appl. No.: 571,420

[22] Filed: Dec. 13, 1995

[51] Int. Cl.[6] .................................................. G03B 21/14
[52] U.S. Cl. ...................................... 353/38; 362/331
[58] Field of Search .................. 353/38, 102; 362/309, 362/308, 326, 330, 331

[56] References Cited

U.S. PATENT DOCUMENTS

| | | | |
|---|---|---|---|
| 3,302,016 | 1/1967 | Larraburu | 353/38 |
| 4,619,508 | 10/1986 | Shibuya et al. | 353/38 |
| 4,769,750 | 9/1988 | Matsumoto et al. | 353/38 |
| 5,098,184 | 3/1992 | van den Braudt et al. | 353/38 |
| 5,418,583 | 5/1995 | Matsumoto | 353/102 |

FOREIGN PATENT DOCUMENTS 0508219  6/1939  United Kingdom ................ 353/38

*Primary Examiner*—William Dowling
*Attorney, Agent, or Firm*—Michael J. Balconi-Lamica

[57] ABSTRACT

An illumination system and method for illuminating an output patch includes a first array for receiving light, and which includes first lenslets. A second array, which includes second lenslets, receives the light from the first array and outputs the light to the illumination patch. The first lenslets have a uniform shape and the second lenslets have a non-uniform shape thereby reducing optical extent and maximizing system lighting efficiency.

13 Claims, 4 Drawing Sheets

42A

42B

INTEGRATING LENS ARRAY AND IMAGE FORMING METHOD FOR IMPROVED OPTICAL EFFICIENCY

BACKGROUND OF THE INVENTION

1. Field of the Invention

The present invention generally relates to an illumination system, and more particularly to a lens array which improves the optical efficiency of the illumination system and a method of forming an image on an output patch of the illumination system.

2. Description of the Related Art

Illumination systems are typically used with projection systems and provide light to projectors which project images and data on a screen for viewing. Generally, a light source is directed in one direction by a reflective collector which creates a light beam. This light beam may be directed by an integrator toward a semi-transparent medium such as a theatrical film or a light valve (liquid crystal display) which then projects an image or data. The image is then focused using a lens on a screen or other appropriate display device.

An exemplary conventional system is shown in FIG. 1, in which a light source 10 emits light beams 17. The light beams 17 are typically reflected by a collector 11 to integrator plates 12A and 12B. Then, the light beams 17 pass through converging lens 13 to a semi-transparent medium 14 to illuminate an image. Thereafter, light beams 17 are focused with a projection lens 15 and the image from the semi-transparent medium 14 is displayed on the screen 16.

The integrator plates 12A and 12B may be separately provided, discrete plates or may be integrally formed as one plate. The integrator plate(s) are typically referred to as "an integrator system" or "an integrator array". The integrator array is for creating a uniform illumination patch. An integrator system typically has two sets of lens plates each with an array of lenslets positioned thereon.

A primary characteristic of plate 12A is that it has multiple convex lenslets 18 facing the light source and a planar surface 19 on the opposite side. Plate 12B has a structure opposite that of plate 12A, and has a planar surface 20 on the side facing the light source and multiple convex lenslets 21 on the side opposite the light source. When plates 12A and 12B are combined into one plate, the two planar surfaces 19 and 20 are formed as one solid section.

The shape of the resulting output patch is determined by the shape of the lenslets on plate 12A. For example, if the desired output area has a rectangular shape, then each of the lenslets 18 on plate 12A is also rectangular. Further, these lenslets are arrayed such that the perimeters of all of the lenslets combined match the circular aperture of the collector 11 as closely as possible.

Lenslets on plate 12B are arrayed in a pattern identical to that on plate 12A. Then, the image of plate 12B is directed onto the aperture of the system. For example, in a projection system, plate 12B would be imaged into the circular aperture of the projection lens 15. Thus, it is generally preferable that the perimeter of the lenses on plate 12B be circular.

Each of the lenslets on an integrator array works in conjunction with a companion (e.g., corresponding) lenslet on the other array. The light path between any pair of corresponding lenslets is independent of the light path of any other pair of corresponding lenslets. Each of the lenslets 18 on plate 12A forms an image of the light source at the center of companion lenslets 21 on plate 12B. Each lenslet 21 on plate 12B, along with the converging lens 13, forms images from its companion lenslet on plate 12A at the semi-transparent medium 14.

However, in prior art systems the extent of the system is large because the size and arrangement of plate 12B is the same as the size and arrangement of plate 12A. "Extent" defines the size of the beam or the size of the corresponding optical system. The maximum usable extent of a projection system is limited by the size of the light valve and the aperture of the projection lens. If the extent of the illumination beam is greater than the extent of the projection system, some light will be lost.

Therefore, it is advantageous for a collection system to produce a light beam with an extent as small as possible to reduce power consumption and to reduce manufacturing costs associated with smaller projection systems. Hence, if a more narrow beam is desired (e.g., a smaller extent) in conventional systems, a large portion of the light is simply blocked and the efficiency of the system is reduced.

Further, the conventional systems are disadvantageous in that the first plate has the same size as the second plate. This creates problems of having the plates fit within a circular aperture and also increases optical extent.

Further, the conventional systems have the problem of center obscuration which wastes space and which has an increased extent.

SUMMARY OF THE INVENTION

In view of the foregoing problems of the conventional systems, it is an object of the present invention to provide a method and apparatus for controlling light in a lens integrator array to improve the optical efficiency of an illumination system.

Another object of the present invention is to provide a method and apparatus for an integrator system, for producing an illumination pattern having a predetermined shape according to a shape of a specific object or aperture to be illuminated.

Yet another object of the present invention is to provide individual lenslet apertures which are advantageously shaped and positioned to provide improved efficiency with systems having a non-circular optical aspect and/or an aberrated collection system. The present invention can advantageously accommodate asymmetric apertures such as non-circular apertures.

In a first aspect of the present invention, an illumination system and method for illuminating an output patch, is provided which includes a first array for receiving light, and which includes a plurality of first lenslets. A second array receives the light from the first array and outputs the light to the illumination patch. The second array includes a plurality of second lenslets. The first lenslets have a shape corresponding to a shape of the illumination patch.

With the present invention, integrator plates are used to change an optical aspect of a light beam and to correct for aberrations in collection optics provided in the illumination system.

Further, an integrator system according to the present invention is provided such that a maximum amount of collected energy from an illumination beam is utilized with a minimum optical extent, thereby resulting in improved system light efficiency and reduced system cost.

Additionally, the present invention can eliminate the dark area associated with center obscuration.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 2:
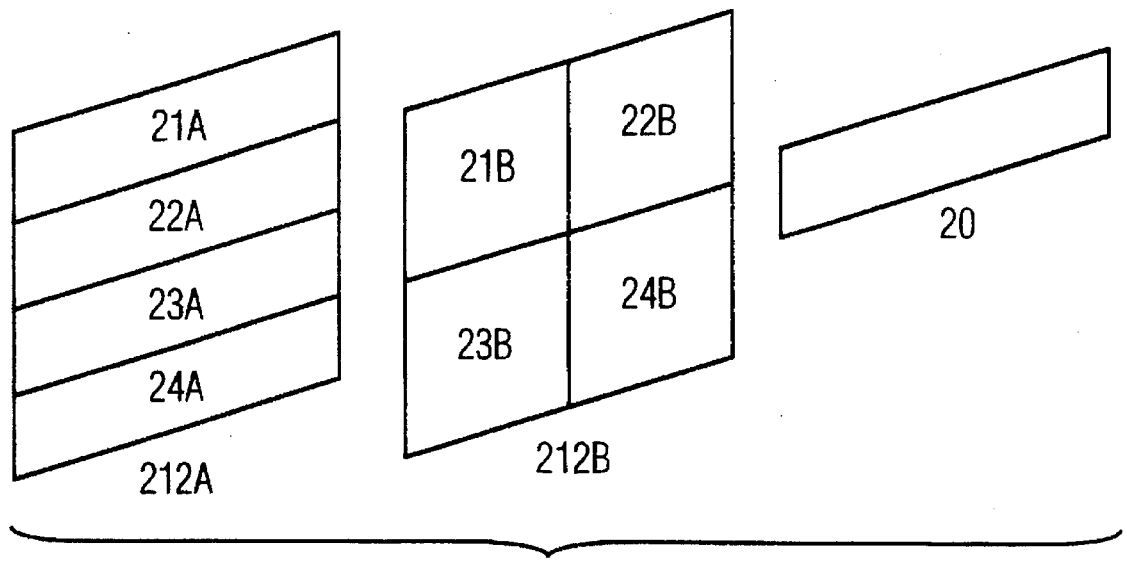
FIG. 2 is a schematic diagram of an integrator array which changes the optical aspect of an illumination system according to the present invention.

Referring now to the drawings, and more particularly to FIG. 2, a preferred embodiment of the present invention for producing optical aspect conversion is illustrated.

An effect realized with integrator arrays is optical aspect conversion. Optical aspects include the optical size (e.g., the "extent" of a beam), the size of the arc image and the size and shape of the aperture. The instant invention allows modification of such aspects with minimum loss of usable light.

Generally, full aperture lenses, such as those in the conventional systems, cannot change the optical aspect of a light beam without losing some portion of the light. However, according to the present invention, lenslet arrays which divide the beam up into independent channels are used to change the optical aspect of a system. Further, the second plate (e.g., plate 212B in FIG. 2) has a different size and/or different lenslet arrangement than that of the first plate (e.g., plate 212A in FIG. 2).

Turning now to the specific details of the present invention, FIG. 2 illustrates lenslets of an integrator array system. Preferably, the lenslets are rectangular-shaped. However, any non-circular shape can be advantageously used. Each lenslet 21A, 22A, 23A and 24A on plate 212A forms an image of the light source on the corresponding lenslet 21B, 22B, 23B and 24B of plate 212B.

Therefore, lenslet 21A forms an image of the light source on lenslet 21B. Similarly, lenslet 22A forms the image on lenslet 22B, lenslet 23A forms the image on lenslet 23B and lenslet 24A forms the image on lenslet 24B.

Figure 3:
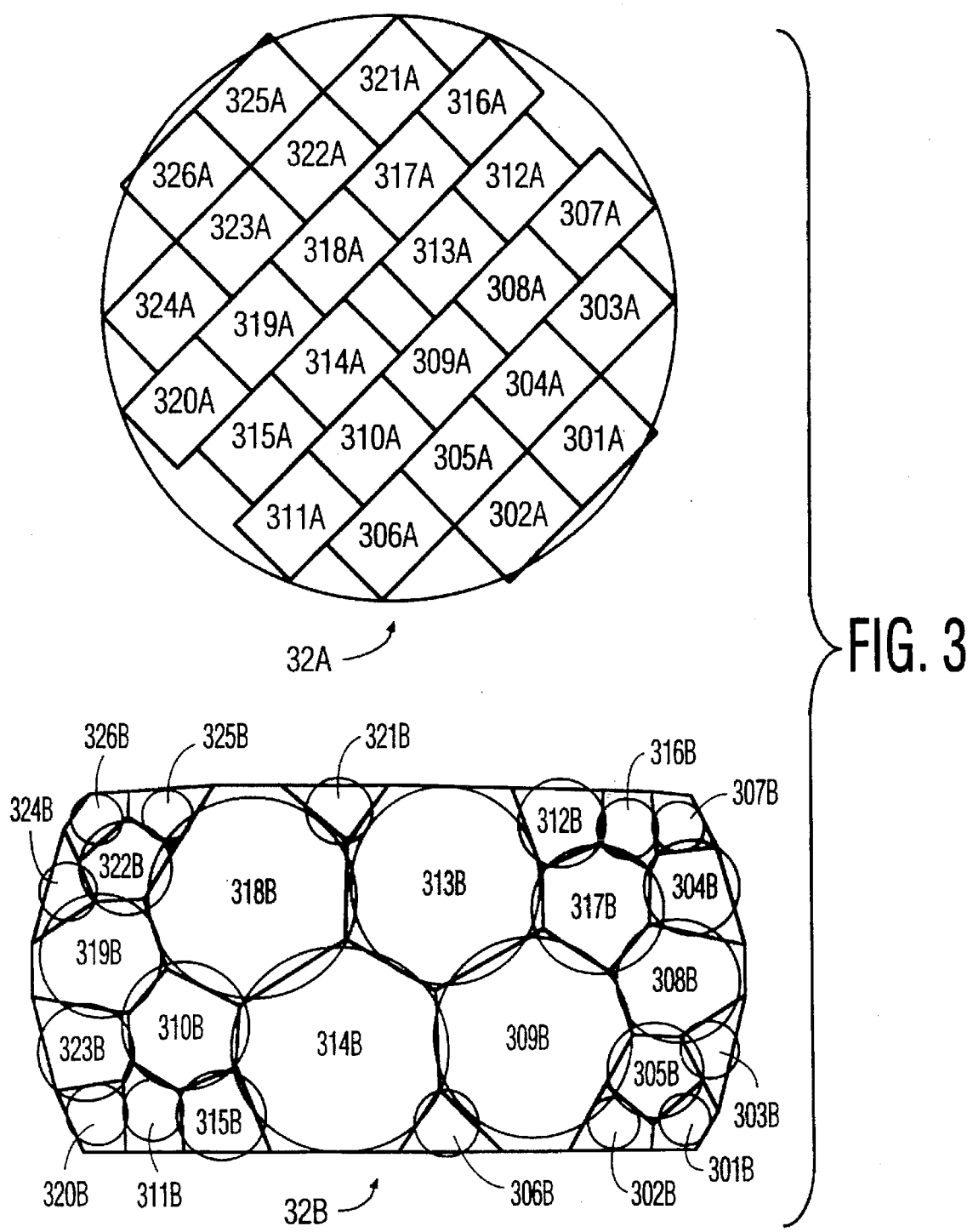
FIG. 3 is a schematic diagram of an integrator array which accommodates an asymmetric aperture, corrects coma in parabolic reflectors and partially fills in center obscuration according to the present invention.

The lenslets on plate 212B are arranged such that the perimeter of plate 212B preferably is square-shaped. FIG. 2 illustrates a representation of four lenslets that may be part of a larger array. Typically, the perimeter of lenses on the first plate 212A has a substantially circular shape, as shown in FIG. 3 (plate 32A). However, the perimeter may have another shape according to design needs. Images of the rectangular lenslets of the plate 212A are directed by the lenslets of plate 212B to overlap at the same location on output patch 20.

Figure 4:
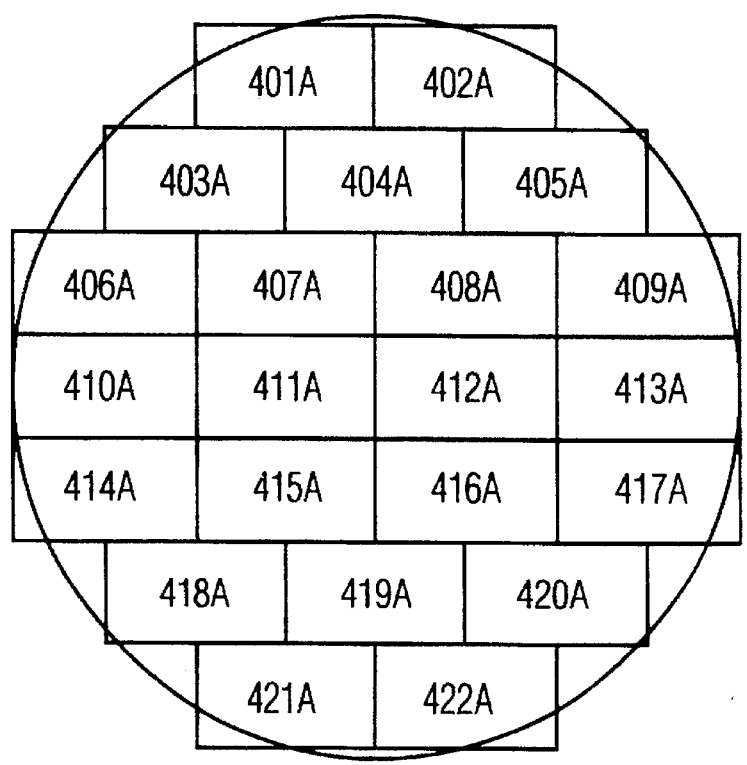
FIG. 4 is a schematic diagram of an integrator array which minimizes the extent of the collected beam for a standard circular symmetric aperture and corrects the effects of a non-spherical arc.
Figure 4:
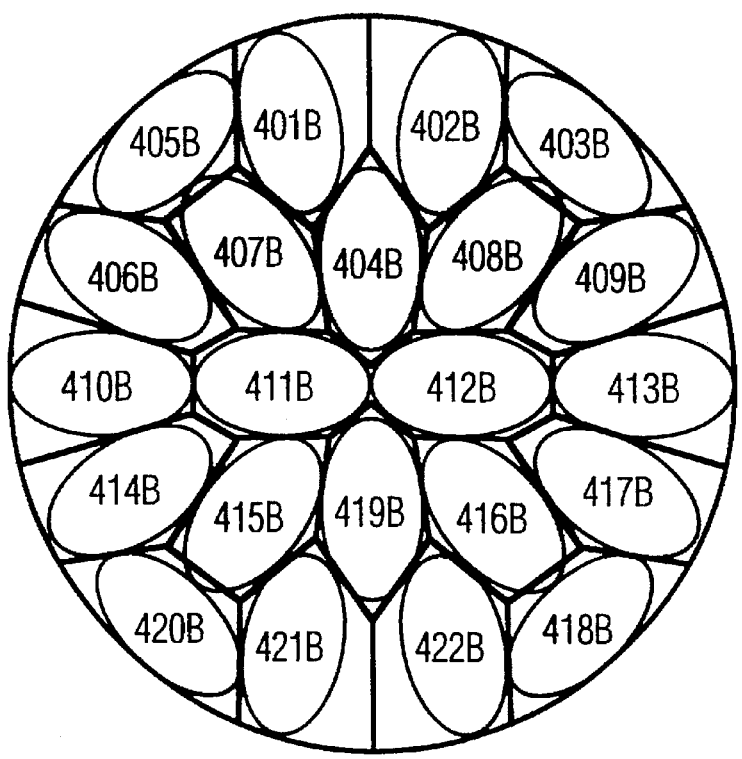

Therefore, the four images from lenslets 21B, 22B, 23B and 24B each are directed to the same output patch 20. Hence, the rectangular output patch 20 is illuminated by the square aperture of plate 212B. Likewise, the perimeter of plate 212B will match the system aperture, which may be circular or non-circular, as shown in FIGS. 3 and 4 and discussed below.

The plates 212A and 212B preferably are formed of molded glass, but can be formed from any of a wide range of transparent substances including any optical glass or optical plastic(s). The plates 212A and 212B preferably have a diameter (e.g., to the perimeter) of 50 mm and a thickness of 10 mm, but of course can be scaled depending on the designer's constraints and requirements. The plate dimensions are determined by the beam size at that point. For example, a plate having a diameter of from 25 mm to 75 mm could easily be formed.

Figure 1:
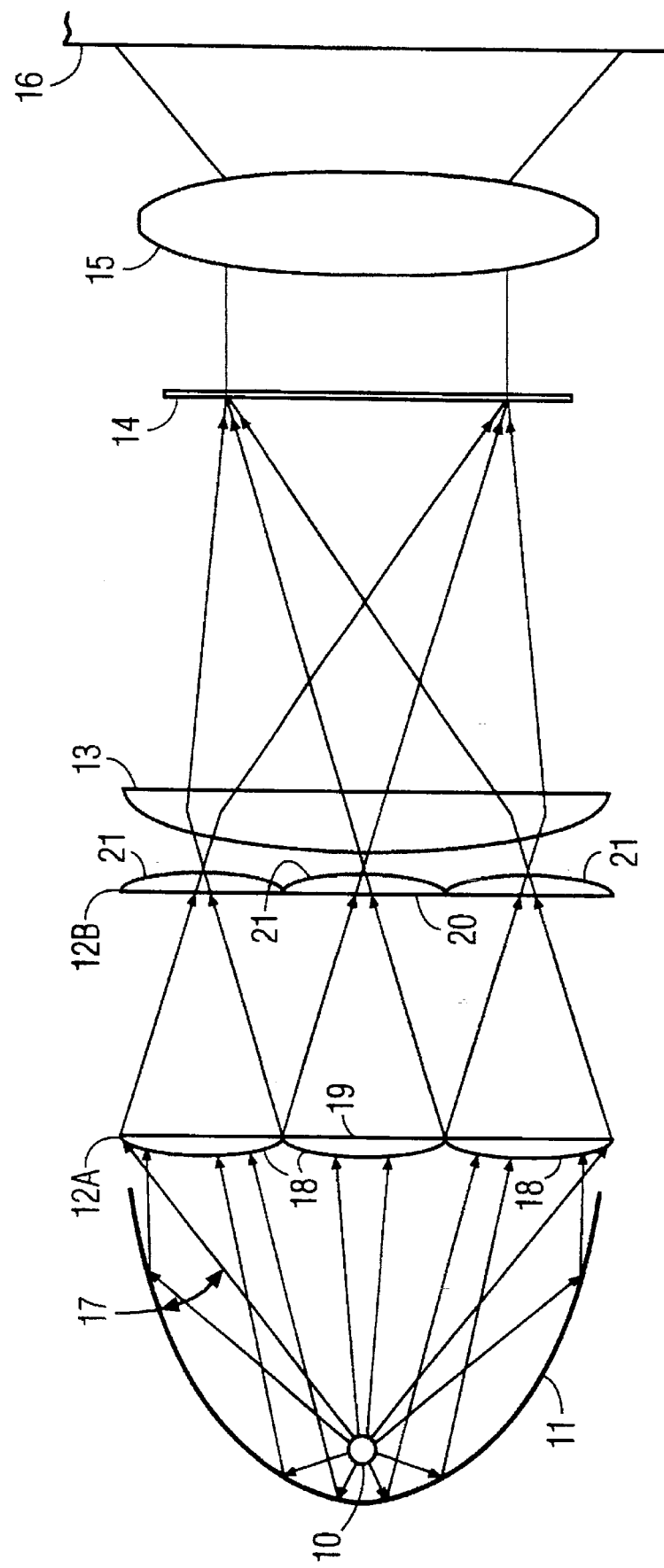
FIG. 1 is a schematic diagram of a conventional illumination system used within a projection system.

The lens plates 212A and 212B can be formed by a number of well-known methods including diamond cutting a mold and molding the plates of optical glass or plastic. Different applications will find the most advantageous mix of cost and quality among these and other well known techniques and materials. Further, lens plate 212B can be joined with or formed as a part of the converging lens 13 (shown in FIG. 1).

According to the present invention, the optical aspect of the system changes from the square shape of plate 212A to the rectangular shape of output patch 20 without loss of light illumination. The optical aspect is changed from square to rectangular. FIG. 2 is a schematic illustration used to show, in a simple format, one of the key features of the invention. In practice, the first plate preferably has a shape that matches the output of the light source or light system. Conventionally, a circular light beam is utilized and, therefore, a preferred shape of the first plate is circular.

In the exemplary design, between plates 212A and 212B the beam has a square aspect of 1:1. In other words, the same amount of light is transferred to the same area. Between plate 212B and the output patch 20, the beam has an optical aspect of 4:1. In effect, the integrator system has transferred a fixed amount of light from one area to a differently-shaped area.

Such aspect conversion is useful in the single panel liquid crystal display (LCD) systems that are illuminated by narrow stripes of light. Such narrow stripes of light require a large aspect ratio. Without aspect conversion as described above, the extent of the input stripe is limited by the shortest dimension of the input because light is clipped or discarded from the circular beam in order to allow it to pass through the short vertical dimension. Typically, the smallest input dimension is so small that much of the light collected from the lamp (e.g., light source) is not used.

Figure 5:
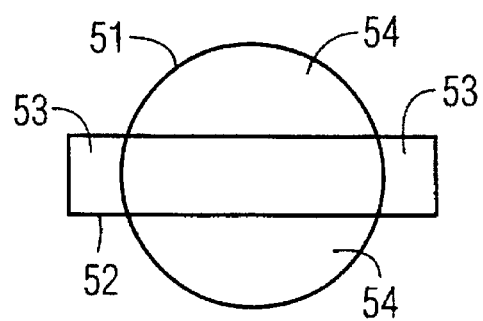
FIG. 5 is a schematic diagram of a rectangular aperture overlaid on a circular light beam to illustrate a benefit of the present invention.

However, if an optical aspect conversion is performed as shown in FIG. 2, then the collection efficiency is greatly increased. Light which is otherwise lost along the short dimension is efficiently relocated. Referring to FIG. 5, this optical aspect conversion will be explained in greater detail below.

In FIG. 5, a circular beam of light 51 is illuminated from a conventional light source or light system. An exemplary rectangular system aperture 52 is illustrated superimposed over the light beam 51. According to the conventional systems, the light areas 54 of the light beam 51 are simply discarded or blocked by a suitable physical filter. However, with the inventive plates, the light from light areas 54 is transferred to aperture areas 53.

With the conventional clipping or blocking, the light in areas 54 is simply lost and the efficiency of the system is correspondingly decreased. However, with the invention's plates, the light from areas 54 is transferred to areas 53 and the efficiency of the system is maintained at a high level.

The rectangular aperture 52 can be any size which is required for a particular application. For example, the height of the rectangular aperture 52 could be 4.2 mm and the width could be 36.8 min.

Using the invention's integrator arrays is also beneficial when an asymmetrical system aperture is desired. Often, the system aperture is circular and symmetrical. However, some systems benefit from an aperture that is non-circular. For example, Digital Micromirror Devices (DMD) benefit from an asymmetrical aperture.

A conventional method of producing a non-circular aperture is to simply block the unwanted portions of the beam at the aperture (as discussed above with respect to FIG. 5). However, this results in relatively high light loss. The invention was designed to overcome this problem.

FIG. 3 illustrates an integrator array system designed for an asymmetric aperture which also compensates for coma of the collector. With the invention's integrator array system, the lenslets 301A–326A on plate 32A are arranged such that their respective perimeters have a circular shape which maximizes interception of light output from the collector and light source.

As similarly shown with respect to FIG. 2, each lenslet on plate 32A directs light only to a corresponding lenslet on plate 32B. Therefore, lenslet 301A directs light to lenslet 301B, lenslet 302A directs light to lenslet 302B, and so forth such that each lenslet on plate 32A directs light to its correspondingly numbered lenslet on plate 32B.

The perimeter of plate 32B is preferably shaped according to the system aperture. Thus, plate 32B acts as the system aperture or the light is imaged into an aperture with the same shape.

The flexibility in designing the elements of plates 32A and 32B also allows correction of aberrations in the collection system. For example, a collector is commonly formed in the shape of a parabola. The integrator array assembly illustrated in FIG. 3 is designed for a spherical light source (arc) that is reflected by a parabolic collector.

However, a parabolic collector introduces a large amount of coma. Coma is an unnatural distortion of the image of the light source. Coma occurs because the arc image size changes as the image of the light source is reflected from different radial positions on the collector. This aberration results in increased optical extent of the collected beam. It is generally preferable for the illumination beam to have the smallest extent possible to increase system light efficiency.

Therefore, the integrator array system illustrated in FIG. 3 is additionally designed to largely compensate for the coma in a collector. Images of the light source are formed by each of the lenslets 301A–326A on plate 32A. Since each of these lenslets receives light from different parts on the parabola, the size of the resulting light source images varies. Each of the lenslets on the plate 32B is only as large as the image of the light source it is to receive. Additionally, the lenslets on plate 32B are packed with a high density, without any space between adjacent lenslets. The images from plate 32A are substantially free from overlap on plate 32B.

For example, lenslet 318A is in a zone which will receive a full image of the light source. Therefore, lenslet 318B is made large enough to receive this image. By contrast, lenslet 325A is in a zone that, because of coma, will receive a substantially reduced image of the light source from the collector. Therefore, lenslet 325B is made relatively smaller since it will receive a small image of the light source.

By reducing the size of the lenslets at a position where the image of the light source is reduced, the total area of the lenslets on plate 32B can be reduced. This allows the aperture to be reduced and also allows the optical extent of the illumination system to be advantageously reduced, as compared to a system in which the lenslets each have a uniform size with respect to one another.

In FIG. 3, the images of the light source formed by the lenslets 301A–326A are superimposed on the outline of the lenslets 301B–326B. The images of the light source are shown as circular lines on plate 32B and the boundaries of the lenslets 301B–326B are shown with linear lines (e.g., hexagonal and other shapes). Therefore, the size of each of the lenslets on plate 32B matches the size of the respective light images lenslets 301B–326B will receive. Thus, FIG. 3 illustrates elimination of coma and is also for use with an asymmetric aperture.

Further, an additional feature is to reduce or eliminate center obscuration. Most light sources have a dark spot or "center obscuration" that is caused by the physical elements of the light bulb and the collector. Specifically, the obscuration area on plate 32A lies between lenslet 313A and lenslet 314A. This obscuration area does not contain a lenslet because there is very little usable light which will reach this portion of plate 32A from the light source. However, plate 32B does not have an obscuration area. Instead, the lenslets on plate 32B are tightly packed. This high density packing eliminates or substantially minimizes the center obscuration.

The integrator array assembly of FIG. 3 was used with an exemplary light source that produced a spherical light. However, it is common for the light source to produce a non-spherical light, such as an arc light with an elongated arc lying along the optical axis of the collector. In such a case, the collector creates an image of the arc oriented along a direction radially to the axis of the collector.

With a non-spherical light source, each of the arc images created by lenslets on the first plate is elongated. To compensate for this distortion, the lenslets on plate 42B in FIG. 4 are designed to follow the size and shape of each of the respective arc images. Thus, the area on the plate 42B, and consequently the extent of the illumination system, are reduced.

FIG. 4 illustrates an exemplary integrator array system including a plate 42A having lenslets 401A–422A and plate 42B having lenslets 401B–422B. The plates and lenslets of FIG. 4 function in a manner substantially similar to that of the plates and lenslets of FIG. 3. Specifically, each lenslet on plate 42A directs light to the corresponding lenslet on plate 42B. The assembly of FIG. 4 was designed assuming the light source was free of coma. The plates 42A, 42B of FIG. 4 compensate for the distortion associated with a nonspherical light source.

As with FIG. 3 above, FIG. 4 illustrates the images of the light source from plate 42A which are illuminated to plate 42B. Therefore, the oval lines within plate 42B represent the illumination pattern that radiates from plate 2A. The linear lines (e.g., having a hexagonal shape and other shapes) within plate 42B represent the boundaries of the lenslets 401B–422B.

Specifically, the lenslets 401A–422A are rectangularly-shaped to match a rectangular aperture. The lenslets 401B–422B are arranged to receive the images of the light source formed by each of the lenslets on plate 42A. The lenslets on plate 42B form overlapping images of the rectangular lenslets on plate 42A at a common aperture (such as output patch 20 in FIG. 2). Of course, lenslets could have other advantageous shapes as would be known by one of ordinary skill in the art within the purview of the present application and which would be determined for a specific application to provide the best packing of arc images formed by the lenslets of plate 42A.

For example, lenslets 411B and 412B have an arrangement substantially similar to that of lenslets 411A and 412A. Conversely, lenslets 401B and 402B are oriented differently to receive the images from lenslets 401A and 402A which have a different orientation because of the azimuth angle intercepted at the reflector. Lenslets 401B and 402B are shaped to accept images of this orientation so that lenslets 401B, 402B occupy a minimum of area on plate 42B.

The ovals are in principle good images of the arc as formed by the collector and the lenslets on plate 42A. The arc images are of different orientations due to the azimuth angle intercepted at the reflector.

The exemplary configurations described above and shown in FIGS. 2–5 illustrate the underlying principle of the present invention.

Specifically, the unique shapes of the lenslets of the first plate (e. g., plate 212A in FIG. 2) in combination with the arrangement and shape of lenslets of the second plate (e.g., plate 212B in FIG. 2) provide efficient transmission of light when a light system has an optical aspect to be adjusted, a reduced extent, a non-circular system aperture, compensate for aberrations from the collector, a uniform illumination patch, and minimize the effect of central obscuration. The shapes of the lenslets on the first plate are defined by the output patch. The unique shapes of the lenslets on the second plate, and the unique mapping of the image position between lenslets on the first plate and images on the second plate allow the foregoing and other benefits. The tight packing (i.e., high density) of the arc images at the second plate significantly reduces optical extent.

As described above, these benefits accrue from the following general structure.

The lenslets of the first plate (212A, 32A and 42A) are determined by the shape of the desired illumination (output) patch. Each of these lenslets forms an image of the light source on the second plate (212B, 32B and 42B). These images are directed such that the images are tightly packed with minimum overlap on the second plate. The perimeter of the images on the second plate matches the shape of the desired system aperture. The lenslets on the second plate are shaped and positioned to accept the respective light images from their companion lenslet on the first plate. Thus, a collimated illumination beam having a reduced optical extent is formed, thereby resulting in increased optical efficiency and/or reduced aperture of the optical components subsequent to the integrator. Hence, a smaller, lighter, less expensive optical system is produced.

While the invention has been described in terms of the foregoing embodiments, those skilled in the art will recognize that the invention can be practiced with modification within the spirit and scope of the appended claims.

For example, while a parabolic collector is discussed above, the particular shape of the collector is arbitrary. Moreover, the collector could be refractive, or reflective, or both.

Additionally, a projector system is described above. However, the inventive illumination system is not limited to a projector system and can be utilized in any device which requires illumination. Further, any number of optical components and lenses can be used between the collector and the integrator arrays. Indeed, most aperture requirements can be met with the foregoing system and most aberrations can be overcome with the foregoing system. For example, a system with a obscuration (dark area) could easily be accommodated by appropriate location the lenslets of the second plate (e.g., plate 32B in FIG. 3).

Having thus described our invention, what we claim as new and desire to secure by Letters Patent is as follows:

1. An illumination system for illuminating an output patch, said output patch having a center, comprising:

a first array for receiving light, said first array including a plurality of first lenslets positioned in a first pattern, each of said first lenslets having a substantially uniform size and shape; and a second array for receiving said light from said first array and for outputting said light to said output patch, said second array including a plurality of second lenslets positioned in a second pattern, said second lenslets having nonuniform sizes and shapes, wherein said first and second patterns are dissimilar to each other relative to said center of said output patch.

2. An illumination system as in claim 1, wherein said first lenslets have a shape corresponding to a shape of said output patch.

3. An illumination system as in claim 1, wherein said first array has a predetermined number of said first lenslets and said second array has said predetermined number of second lenslets.

4. An illumination system as in claim 1, wherein ones of said first lenslets correspond to respective ones of said second lenslets.

5. An illumination system as in claim 1, wherein said first array has produced thereon a center obscuration of said light, said sizes and shapes of said second lenslets of said second array eliminating said center obscuration from said output patch.

6. An illumination system for illuminating an output patch, comprising:

a first array for receiving light, said first array including a plurality of first lenslets positioned in a first pattern, each of said first lenslets having a substantially uniform size and shape; and a second array for receiving said light from said first array and for outputting said light to said output patch, said second array including a plurality of second lenslets positioned in a second pattern, said second lenslets having nonuniform sizes and shapes, said first array having a first shape, said second array having a second shape, said system having an aperture having a third shape, wherein said second and third shapes are similar, and different from said first shape.

7. An illumination system as in claim 6, wherein said aperture comprises a non-circular aperture.

8. A method of forming an image on an output patch of an illumination system, said output patch having a center, comprising steps of:

providing a first array for receiving light;

positioning a plurality of first lenslets in a first pattern on said first array, said first lenslets having a uniform shape and size;

transmitting said light from said first array to a second array;

positioning a plurality of second lenslets in a second pattern on said second array, said second lenslets having a nonuniform shape and size; and outputting said light from said second array to said output patch, wherein said first pattern and said second pattern are dissimilar to each other relative to said center of said output patch.

9. A method as in claim 8, further comprising a step of shaping said first lenslets to correspond to a shape of said output patch.

10. A method as in claim 8, wherein said transmitting step comprises a step of forming substantially non-overlapping images of said light in said second pattern on said second array.

11. A method as in claim 8, wherein said step of positioning said second lenslets includes a step of determining a density of said second lenslets on said second array such that no gaps exist between adjacent lenslets of said second lenslets.

12. An illumination system for illuminating an output patch, comprising:

a first array for receiving light, said first array including a plurality of first lenslets positioned in a first pattern, each of said first lenslets having a substantially uniform size and shape, said first array having a shape substantially the same as that of said output patch; and a second array for receiving said light from said first array to form a pattern of arc images, and for outputting said light to said output patch, said second array including a plurality of second lenslets positioned in a second pattern, said second lenslets having nonuniform sizes and shapes, wherein said first and second patterns have a different configuration from one another, and wherein said first array directs said arc images in a pattern such that said arc images have a maximum possible packing density with substantially no overlap of said arc images and a perimeter of such images has a shape of an aperture of said system.

13. A method of forming an image on an output patch of an illumination system, comprising steps of:

providing a first array for receiving light;

positioning a plurality of first lenslets in a first pattern on said first array, said first lenslets having a uniform shape and size;

positioning a plurality of second lenslets in a second pattern on said second array, said second lenslets having a nonuniform shape and size; and outputting said light from said second array to said output patch, wherein said system includes a non-circular aperture, said method further comprising a step of forming said second array to have a perimeter with a shape corresponding to said non-circular aperture.

* * * * *